J. M. BROWNING.
FIREARM.
APPLICATION FILED FEB. 17, 1910.

984,519.

Patented Feb. 14, 1911.

Witnesses.
C. F. Robinson
K. Powers Inventor.
John M. Browning.
per C. J. Ehbets.
Attorney.

J. M. BROWNING.
FIREARM.
APPLICATION FILED FEB. 17, 1910.

984,519.

Patented Feb. 14, 1911.
3 SHEETS—SHEET 3.

Witnesses.
C. L. F. Robinson
K. Powers.

Inventor.
John M. Browning,
by C. J. Ehbets.
Attorney.

UNITED STATES PATENT OFFICE.

JOHN M. BROWNING, OF OGDEN, UTAH.

FIREARM.

984,519.  Specification of Letters Patent.  Patented Feb. 14, 1911.

Application filed February 17, 1910. Serial No. 544,400.

*To all whom it may concern:*

Be it known that I, JOHN M. BROWNING, a citizen of the United States, residing in Ogden, in the county of Weber and State of Utah, have invented certain new and useful Improvements in Firearms, of which the following is a specification, reference being had to the accompanying drawings, forming a part hereof.

The invention relates to automatic firearms of that description in which the several operations,—such as the opening of the breech after firing a shot, the ejection of the empty cartridge-shell, the cocking of the hammer, the presentation and introduction of a loaded cartridge to the chamber of the barrel, and the closing and locking of the breech—are automatically effected through or by the energy of the recoil of the breech-bolt or that part which at the time of firing the shot closes the breech of the barrel, and the invention more especially relates to firearms of this description in which, in firing, the barrel and the breech-bolt are interlocked and recoil some distance together, and during this rearward movement the barrel has another movement imparted to it, whereby it is unlocked from the breech-bolt, and after its release the movements of the barrel are arrested, while the breech-bolt continues to recoil until the breech is fully opened, and in which during the opening movement of the breech-bolt energy is stored in a spring, the reaction of which is utilized to effect the return or closing movement of the breech-bolt. It is essential for the proper operation of firearms of this class that the breech-bolt and the parts connected and moving with it should be made as heavy as practicable, so that it may store a maximum amount of energy in the short time during which on firing the rearward pressure of the powder-gases in the barrel acts upon the breech-bolt and initiates its recoil, and so that the breech-bolt may continue to recoil under its momentum alone to complete the opening of the breech and the compression of the reaction-spring after the gas-pressure has ceased because relieved by the exit of the bullet from the barrel. On account of the limited total weight practical for a small-arm, and especially for a pistol, it is necessary in order to be able to give a maximum weight to the breech-bolt, that the other parts of the arm, the frame and the barrel, be constructed as light as possible. This is especially important regarding the barrel of this class of arms, for the additional reason that at the commencing of the recoil the light barrel may readily yield to and move rearward with the breech-bolt while it remains interlocked therewith, and in order that when unlocked from the breech-bolt, the movements of the barrel may be arrested, without causing by this sudden stopping injury to either the barrel or the frame of the arm.

The main object of the present invention is to produce a firearm of this class which, in order to be specially adapted for the military service, shall be not only practical, efficient and perfectly safe in use, but strong and capable of withstanding the exposure and rough usage of service in the field, and adapted to fire cartridges having bullets of large caliber and weight and powerful charges of powder; it shall also be very simple in construction so as to be reliable under all conditions of service and not liable to get out of order, inexpensive of manufacture, with a minimum number of parts, and readily dismounted and cleaned without requiring the use of any tools.

Another object of the invention is to produce a firearm of this class in which to insure the absolute safety of the user the breech-slide, comprising the breech-bolt and the forward extension of the same covering the barrel, and the movable abutment inclosing the reaction-spring shall be combined in one strong integral whole without a division or joint therein and shall be mounted upon the top of the frame from the front, to be so held and guided in its reciprocation thereon that it can be removed from the frame as one whole only and in the forward direction alone, by which the possibility of any part of the arm being thrown rearward shall be positively guarded against.

Another object of the invention is to produce a firearm of this class in which the barrel shall first be seated in the forward part of the breech-slide, shall then be mounted with the breech-slide upon the frame from the front, and finally the barrel shall be securely connected with and movably attached to the frame in such a manner that the barrel may be at will and readily detached and disconnected from the frame, so that it can be removed from the frame with the breech-slide in the forward direction only.

Another object of the invention is to provide in a firearm of this class a simple but strong and reliable means of attachment and connection between the barrel and the frame of the arm, which shall leave the barrel free to recoil a limited distance interlocked with the breech-bolt and which shall during this rearward movement guide the barrel and impart to it at the same time another movement by which it will be unlocked from the breech-bolt, and which shall at the last of the return or forward movement of the breech-bolt guide the barrel while it is moved forward by the breech-bolt and impart to it another movement by which the barrel and the breech-bolt will be interlocked when they arrive at the forward firing position; this means of attachment and connection shall at the same time be the means which shall positively limit the rearward movement of the barrel with the breech-bolt, arrest the movements of the barrel as soon as the same becomes unlocked from the breech-bolt, and which shall be adapted in location, form and strength to transmit to the frame the stress due to the sudden arrest of the movements of the barrel without injury resulting therefrom to either the barrel or the frame or to the means of attachment between the same; such means shall further positively limit and arrest the forward or return movement of the barrel and of the breech-slide when the same arrive at the firing position.

Another object of the invention is to produce a firearm of this class in which, to insure absolutely against the dangerous accidental firing sometimes liable to occur if the trigger is pulled after the magazine has been withdrawn, in the belief that all cartridges have been removed from the arm with the magazine, whereas the loaded cartridge last fed to the barrel still remains in the chamber, the magazine-catch shall not only lock the magazine in its seat or at will release the magazine, but the catch shall also automatically lock the trigger against operation whenever there is no magazine in the seat, and shall automatically release the trigger when a magazine is entered into the seat and is there locked by the catch.

These objects are attained by mechanism of simple and practical construction, which is perfectly safe, efficient and not liable to get out of order.

Various other features of improvement will be more particularly referred to hereinafter.

The embodiment of my improvements represented in the accompanying drawings is a magazine-pistol, such as is shown and described in the United States Patent No. 580,924, granted to me April 20th, 1897; but it will be understood that I do not intend to restrict the present invention to a magazine-pistol, nor to any particular kind of firearm, nor to the combination of the several features in a single firearm.

In the accompanying drawings: Fig. 4 is a view similar to Fig. 1, but with the breech-slide in the open rearward position, and with the breech-slide and the frame in longitudinal section. Figs. 5 and 6 are respectively left and right end views of the magazine-catch, detached. Fig. 7 is a top view of the magazine-catch, the adjacent parts of the frame, magazine and trigger being indicated by dotted lines. Figs. 7$^a$ and 7$^b$ are respectively front and rear views of the magazine-catch detached. Fig. 8 is a longitudinal section of the breech-bolt detached, in the horizontal plane through the axis of the shell extractor, seen from above. Fig. 9 is a front view, Fig. 10 a side view with the forward portion in longitudinal section, and Fig. 11 a bottom view of the breech-slide, detached. Fig. 12 is a front view, Fig. 13 a side view with the forward portion in longitudinal section, and Fig. 14 a top view of the frame, detached, the lower portion of the guard and of the grip being broken away in the front and side views. Figs. 15, 16 and 17 are respectively front, side and rear views of the bushing $h$ for the front end of the breech-slide, detached. Figs. 18, 19 and 20 are respectively front, side and rear views of the plug $f$, for the forward end of the reaction spring, detached. Figs. 21, 22 and 23, are respectively side, top and rear views of the combined link-pin and breech-slide-stop, detached, a portion of the top view being shown in longitudinal section, to expose to view the small spring-actuated piston seated therein.

Similar letters refer to similar parts throughout the several views.

The three main parts of the pistol represented in the drawings are the frame $a$, the barrel $b$ mounted upon the frame for a limited double movement thereon, and the breech-slide or bolt-carrier $c$, which slides rearward and forward upon the frame under the action of the recoil and of the reaction-spring. The frame $a$ is straight at the top and has suitable guides for the reciprocating breech-slide $c$, the rear portion of which forms the breech-bolt $c^1$.

The frame extends downward in form of the handle or grip $a^1$ of the arm. In the interior of the grip $a^1$ is the seat for the detachable cartridge-magazine, in which cartridges are held one upon the other upon a spring-follower, by which they are fed upward to the receiver in the frame. In rear of the grip the hammer and other members of the firing- and safety-mechanisms are arranged, while the trigger in the trigger-guard is located in front of the grip.

All the parts thus far referred to may be and are here shown as of the same construction and mode of operation as fully set forth in the said Patent No. 580,924, and forming no part of the present invention require no further description or explanation herein, except so far as certain features will be referred to hereinafter.

The barrel $b$ is attached at its breech only to the top of the frame, for this purpose the barrel having near its rear end where it is largest and strongest a depending lug $b^1$ projecting downward into a central recess $a^3$ of corresponding width in the top of the frame, whereby the breech end of the barrel, when in its place, is guided and its axis is always kept within the vertical plane through the axis of the frame. In the lug $b^1$ is a vertical central slot in which the link $d$ is seated and by a pivot-pin attached to the barrel. The lower part of the link $d$ is larger than the upper, and a second pivot-pin $i$, considerably larger than the upper one, is fitted transversely through the frame and through the link, and serves to movably attach the barrel $b$ to the frame $a$. This attachment permits the barrel to swing on the link $d$, and to move longitudinally and at the same time vertically a limited distance, the limit of this double movement in the rearward direction is the contact of the rear face of the lug $b^1$ with the rear end of the recess $a^3$ in the frame, and in the forward direction the movement is limited by the lower end of the lug $b^1$ coming into contact with the lower link-pin $i$ at each side of the link. For this purpose, while the lower and forward face of the lug $b^1$ is parti-circular in form, concentric with the upper pivot-pin which holds the link to the barrel, and of such a radius that this part of the lug clears and freely moves over the lower pivot-pin $i$ which holds the link to the frame, the rear face of the lug $b^1$ is straight, extending vertically down below the center of the lower pivot-pin $i$, and between the rear face and the lower edge of the lug $b^1$ this extension forms a projection at the bottom of the lug which, coming in contact with the lower pivot-pin $i$ at the last of the forward movement of the barrel, limits this movement. The forward side of this projection is rounded to correspond with and fit upon the pivot-pin $i$.

Heretofore in the arms of this class in which the barrel is movably attached to the frame and in which the breech-bolt and an integral forward extension of the same together form the breech-slide, which serves to cover the barrel and to interlock the barrel and the breech-bolt in the firing position, an arrangement such as is shown and described in the patent referred to, No. 580,924, it was necessary to first mount the barrel upon the frame and attach it thereto, then to mount the breech-slide from the rear upon the frame and slide it forward over the barrel, and finally to securely lock the breech-slide to the frame and connect it with the reaction-spring therein by means of the combined slide-lock or key and abutment for the reaction-spring. For ease in assembling and dismounting it was necessary that this slide-lock could be readily put in place or removed. With this arrangement and with the breech-slide removable rearward from the frame, in case the slide-lock had not been put in place or had not been properly secured, it became possible that, on firing the arm, the breech-slide might be thrown rearward from the frame. By my improved construction the breech-slide can be mounted upon the frame from the front only and can be removed in that direction alone, and it can not under any conditions be thrown from the frame to the rear.

The rear part of the breech-slide forms the breech-bolt $c^1$ and forward of this the breech-slide extends in form of a tube from which a part has been removed opening it at the bottom. At the forward end the breech-slide is closed at the bottom by a second smaller tube, which depending downward from it and extending some distance to the rear, with its axis parallel to that of the breech-slide, forms the strong integral front abutment $c^2$, the interior of which is the seat for the forward portion of the reaction-spring. From the abutment $c^2$ rearward, throughout the remaining length of the breech-slide, its sides project downward overlapping the sides of the frame, and are provided with internal longitudinal grooves and ribs which interlock with corresponding ribs and grooves near the top in the sides of the frame, and serve to secure the breech-slide vertically upon the frame and guide it in its movements thereon.

At the front the frame has a semi-tubular extension $a^2$ the axis of which coincides with the axis of the depending abutment $c^2$ of the breech-slide when it is mounted upon the frame, and the internal diameter of the extension $a^2$ corresponds with the external diameter of the abutment $c^2$, so that the abutment will enter into the extension and slide therein when the breech-slide moves. At the rear end of the bore of the extension $a^2$ the front of the top of the frame forms a strong vertical shoulder $a^4$, at each side of the recess $a^3$; (see Figs. 12, 13 and 14) this shoulder stands in the path of the depending abutment $c^2$ and positively limits the rearward movement of the same. As the abutment is integral and strongly connected with the breech-slide, and projects into the plane of the frame, the breech-slide can be mounted upon and removed from the frame only from the front and it is positively prevented from being thrown rearward from the frame.

The bore of the abutment $c^2$ is such that the reaction-spring $e$ can freely move therein, and the forward portion of the bore is enlarged to admit the plug $f$ which closes the front of the abutment and incloses the forward end of the reaction-spring $e$. The rear end of the reaction-spring fits upon a guide-tube $g$ and bears against a collar upon the same, and the rear end of the guide-tube $g$ fits into the recess $a^3$ in the front of the top of the frame against the shoulder $a^4$ of which the collar of the guide-tube $g$ bears.

Figures 4, 5, 6, 7, 7A, 7B, 8:
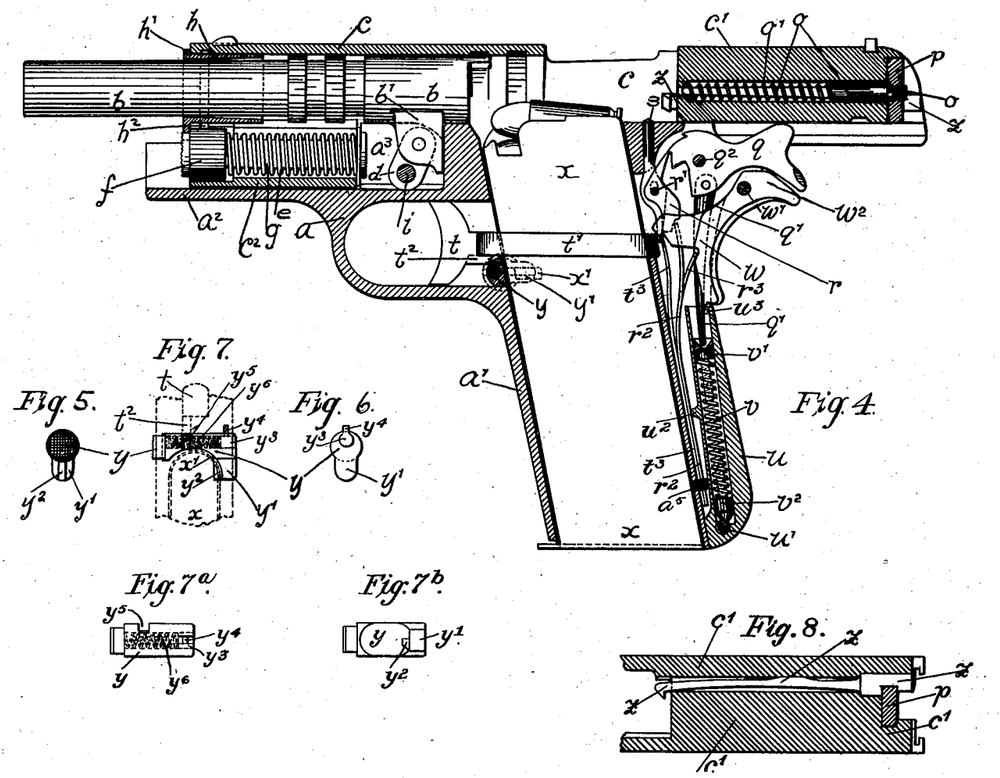
Figures 9, 10, 11, 12, 13, 14, 15, 16, 17, 18, 19, 20, 21, 22, 23:
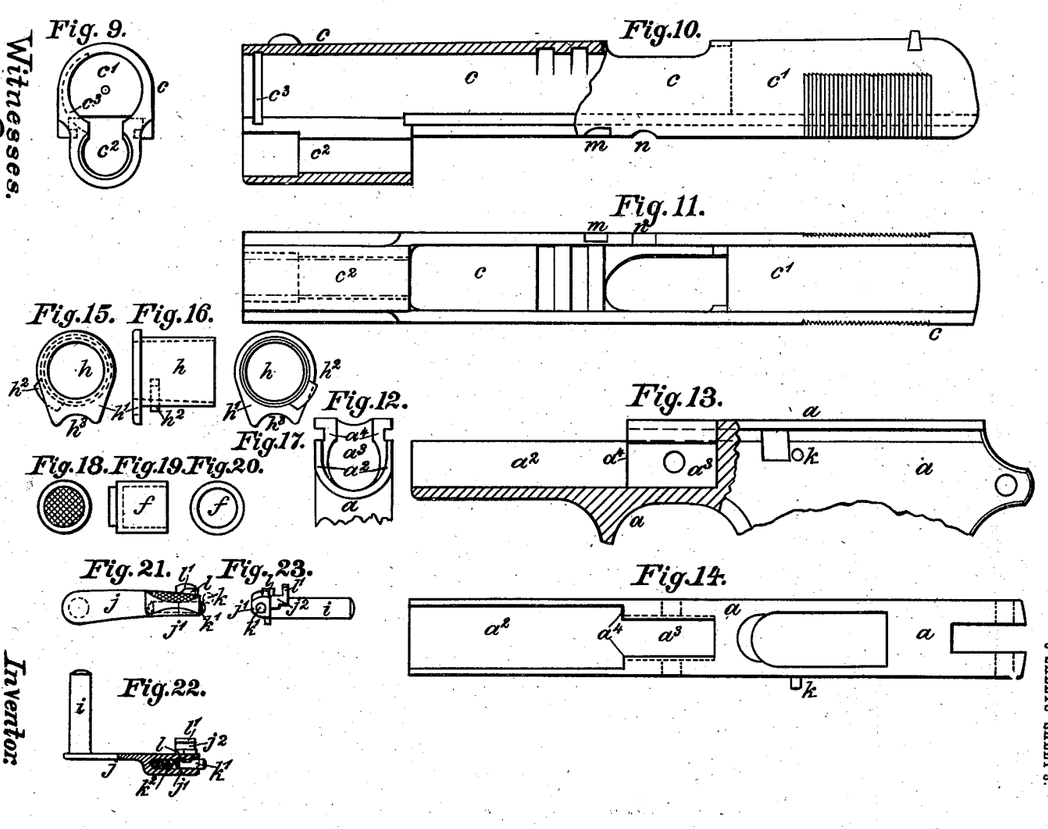

The bore of the abutment $c^2$ is open at the top, being connected throughout its length with the bore of the breech-slide by a vertical passage, (see Figs. 4, 9 and 10). In the forward end of the breech-slide the bushing $h$ is seated, a projecting flange $h^1$ of which rests against the front of the breech-slide and extends downward to the abutment where a segmental recess $h^3$ in the flange fits over and receives the reduced end of the plug $f$ projecting from the abutment $c^2$. In rear of the flange a segmental lug $h^2$ projects from the lower surface of the bushing $h$, at the right side of and at an angle to the vertical plane through the axis of the bushing (see Figs. 2, 15, 16 and 17). On entering the bushing in to the breech-slide the bushing is turned on its axis until the lug $h^2$ is centrally under the bushing and enters into the passage leading from the breech-slide to the abutment, then a segmental groove $c^3$, cut in the interior surface of the breech-slide on the right side at the proper distance rearward and connecting at the right side with the passage, receives the lug $h^2$ when the bushing is fully entered and is turned until the recess $h^3$ in the flange coincides with the bore of the abutment $c^2$. By this arrangement the lug $h^2$ locks the bushing in the breech-slide, the reduced end of the plug $f$ standing in the recess $h^3$ in the flange prevents the bushing from being turned, and the shoulder on the plug $f$ formed by the reduced front end of the same, is pressed by the reaction-spring $e$ against the flange $h^1$, and thereby transmits the tension of the compressed reaction-spring $e$ in forward direction to the bushing $h$ and through it to the breech-slide $c$. The flange $h^1$ of the bushing $h$ thus forms the front abutment for the reaction-spring, and the bushing $h$ forms the connection between the reaction-spring and the breech-slide.

At the forward end the bushing $h$ fits closely upon the forward portion of the barrel $b$, but in rear the bore of the bushing is enlarged so that while the bushing holds the muzzle of the barrel securely in position, it allows the rear end of the barrel to move vertically a limited distance, the barrel turning during this movement upon its forward end as upon a fulcrum.

Before the barrel or the breech-slide are mounted upon the frame, the barrel $b$ with the link $d$ attached thereto in the lug $b^1$, is placed from the front in the breech-slide, the depending lug and link entering and passing through the open passage between the breech-slide and the abutment $c^2$, then the plug $f$ is placed upon the forward end of the reaction-spring $e$, and fitting firmly upon the same, the spring and the plug are from the front entered into the abutment $c^2$, and the guide-tube $g$ is placed in the rear end of the reaction-spring, then the plug $f$ is pressed back into the abutment and the bushing $h$ is placed upon the barrel and in the breech-slide and locked in the same as hereinbefore described.

The breech-slide, with the barrel and the reaction-spring contained therein, is then mounted from the front upon the frame, the lub $b^1$ and link $d$ entering the recess $a^3$, the end of the guide-tube $g$ finding its seat in the recess, and the link $d$ moving rearward with the barrel until the hole in the link for the lower pivot-pin coincides with the corresponding hole in the frame, when the pivot-pin $i$ is inserted and pushed into its place, thereby securing the barrel to the frame and limiting the movements of the barrel and of the breech-slide upon the frame in both directions. For easier handling the pivot-pin $i$ is provided with a handle $j$ which projects at right angle from the end of the pin, and extending rearward rests against the left side of the frame $a$ when the pin is in its place, (see Figs. 1, 3, 21, 22 and 23.)

In order to adapt the handle to be readily moved upward and downward by the thumb of the hand grasping the grip, the rear end of the handle $j$ carries a projecting thumb piece $j^1$. A lug $j^2$ projects from the handle inward through an opening in the side of the frame into the top of the magazine-seat, this opening in the frame permitting a limited movement vertically to the handle $j$, for which the pivot-pin $i$ turns in its seat; within the thumb-piece $j^1$ a small piston $k^1$ and spiral spring $k^2$ are secured, (see Figs. 21, 22 and 23), while a round stud $k$ projects from the frame at the rear of the handle, the protruding end of the spring-pressed piston $k^1$ bears against the stud $k$ and yieldingly holds the handle $j$ in either the raised or lowered position to which it may be moved at will by pressure on the thumb piece. On the outside of the frame above the thumb piece the handle $j$ carries an upward projection $l$, and the breech-slide has a corresponding recess $m$ in its lower edge, both projection and recess being square at the rear and inclining at the front.

The inner end of the lug $j^2$ does not interfere with the passage of the cartridges from the magazine to the chamber in the barrel, but when the last cartridge has been fed from the magazine, the lug $j^2$ stands in the path of the spring-follower of the magazine, and when the breech-slide is moved to the rear above the empty magazine, the follower will raise the lug $j^2$ and the handle $j$ and cause the projection $l$ to enter the recess $m$ in the breech-slide, thereby locking the same in the open rear position, and serving as an indicator to show that the empty magazine must be replaced by a charged one before the firing can be continued. After placing the magazine in the grip the breech-slide is released by depressing the handle $j$.

A slide-stop actuated by the magazine-follower to arrest the breech-slide in the open position when the magazine is empty, has been heretofore described and shown in the United States Patent No. 708794, granted to me September 9, 1902, but the construction of the slide-stop as an integral part of the handle of the pivot-pin securing the barrel and the breech slide upon the frame, as herein shown and described, is a novel improvement which reduces the number of parts and simplifies the dismounting and assembling of the arm.

Upon the inner end the lug $j^2$ of the handle $j$ carries a slight upward projection $l^1$ which stands inside of the lower edge of the breech-slide, and, with the breech-slide upon the frame, the inner edge of the same locks the handle $j$ laterally in position on the frame and thus locks the pivot-pin $i$ against being accidentally displaced or removed, to insure this locking even while the recess $m$ in the edge of the breech-slide stands above the upward projection $l$ on the thumb-piece, the projection $l$ and the recess $m$ do not extend inward entirely through the edge of the breech-slide, but an uncut portion of the edge remains forming a partition between the recess $m$ and the interior of the breech-slide, and preventing the projection $l^1$ on the lug $j^2$ from passing outward through the recess.

Some distance in rear of the recess $m$ a second recess $n$ is cut in the edge of the breech-slide, less high and shorter than the forward recess $m$, but cut entirely through the edge. The location of this recess $n$ is such that in the regular operation of the breech-slide the movement of the same is not arrested when the recess $n$ is above the thumb-piece $j^1$, but the recess is carried beyond the same in either direction, so that the projection $l$ is not likely to enter this recess, and both ends of the recess $n$ are inclining, so that, when the breech-slide moves the projection $l$ will be forced downward out of the way even in the case it should have partly entered into the recess.

For at will removing the pivot-pin $i$ the breech-slide is moved rearward until the recess $n$ stands above the projection $l$, then pressure is applied against the end of the pivot-pin $i$ protruding from the right side of the frame, and the pin $i$ and handle $j$ will yield, the lug $j^2$ with the projection $l^1$ upon it will pass outward through the opening in the frame and the recess $n$, until the handle $j$ has been moved sufficiently away from the side of the frame that it may be grasped and together with the pivot-pin $i$ withdrawn, after which the breech-slide containing the barrel and the reaction-spring may be removed from the frame in the forward direction. For replacing the pivot-pin $i$, the breech-slide with the spring and the barrel, is moved to the position in which the recess $n$ coincides with the opening in the frame, when the pin $i$ may be inserted, the lug $j^2$ entering through the recess $n$ and the opening in the frame.

Figures 1, 2, 3:
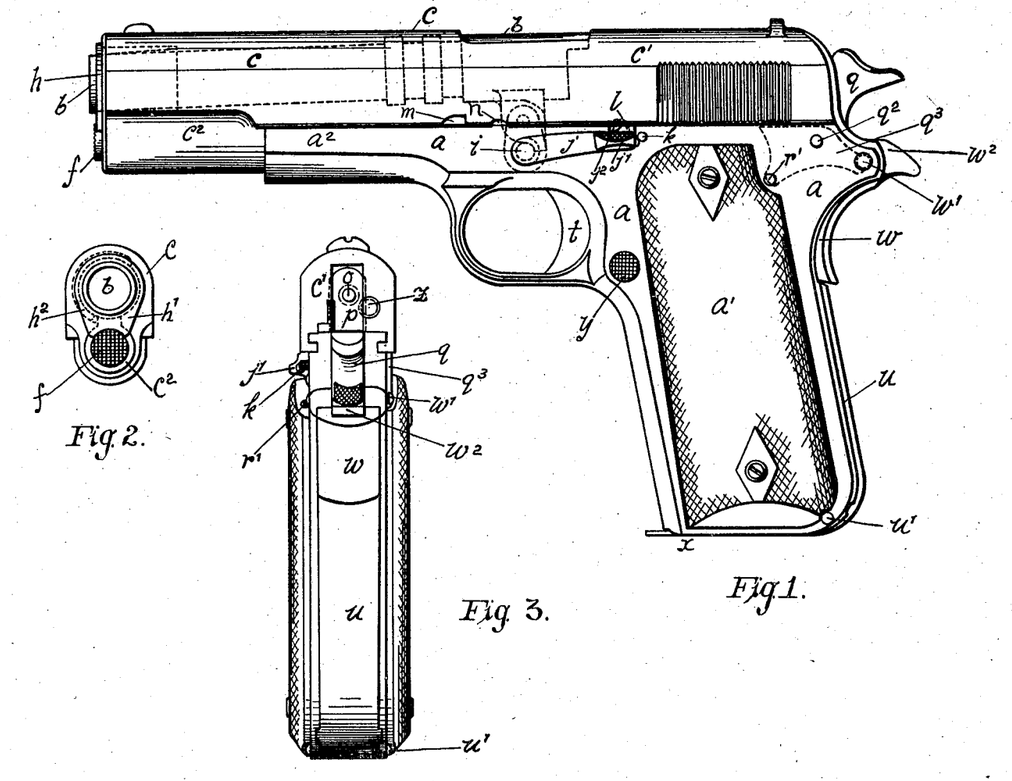
Figure 1 is a left-hand side elevation of the pistol with the breech closed.
Figs. 2 and 3 are respectively front and rear end views of the same.

With the breech closed and the breech-slide and barrel in the forward position, Fig. 1, the link stands upright, the end of the lug $b^1$ bears against the pivot-pin $i$, and the rear end of the barrel is raised to its highest position in which the enlarged rear portion of the barrel and two ribs of similar diameter projecting forward of the same from the barrel, occupy corresponding recesses in the top of the breech-slide and interlock the barrel and the breech-slide in firing position, while the muzzle of the barrel remains securely supported in the bushing $h$. In this closed firing position the barrel is therefore situated not parallel with the top of the frame and breech-slide, but the axis of the closed barrel inclines forward and downward at a considerable angle; however, as both ends of the barrel are firmly secured in this position, and as on firing a shot the inertia of the heavy breech-slide and of the barrel delays the rearward movement of these parts until after the bullet has passed from the muzzle of the barrel, the inclined position of the barrel does not affect the accuracy of the arm. In consequence of the depressed position of the muzzle of the barrel at firing, the front sight upon the breech-slide may be much lower than it would have to be if the muzzle were raised and the barrel were parallel to the breech-slide. The low front sight is a decided advantage in a military pistol, because it facilitates the drawing of the arm from its holster; whereas a high front sight forms a projection very liable to catch and to interfere with the ready drawing of the pistol. On firing, the breech-slide recoils and carries the barrel rearward until the rear end of the same, swinging rearward and downward on the link and pivot-pins, becomes unlocked from the breech-slide and its movements are arrested in its lowest rearward position by the lug $b^1$ striking the end of the recess $a^3$ in the frame, while the breech-slide continues its rearward movement, Fig. 4, during which the bushing $h$ slides upon the forward portion of the barrel.

In rear of the barrel the breech-slide forms the breech-bolt $c^1$, in which the firing-pin $o$ and retractor-spring $o^1$ of usual form are carried. The rear end of the firing-pin $o$ is reduced in diameter and a plate $p$, fitted to slide from below in vertical grooves in the rear end of the breech-bolt, closes the seat of the firing-pin; the central hole in the plate $p$ loosely fits upon the reduced end of the firing pin and allows the same to protrude through the plate for receiving the blow of the hammer and transmitting it to the primer of the cartridge in the barrel. For seating the plate $p$ in the breech-bolt, the firing-pin is pressed forward until it clears and allows the plate $p$ to slide up into its place, then the spring $o^1$ will press the firing-pin rearward until its reduced end enters and protrudes through the hole in the plate; by this arrangement the plate locks the firing-pin in the breech-bolt, and the firing-pin locks the plate in the same. To remove the plate and the firing-pin, the firing-pin is pressed forward until it clears the plate, which is withdrawn, leaving the firing-pin free for removal. Both these parts may thus be placed in position or removed without the aid of any tools. The breech-bolt also carries the extractor $z$ for drawing the empty cartridge-shell from the chamber of the barrel and carrying it rearward until it is ejected through the opening in the breech-slide, in the usual manner. At the forward end the extractor $z$ has the usual hook which projects from the breech-bolt and is yieldingly held in position to engage the cartridge which the breech-bolt transfers from the magazine to the chamber of the barrel; when the breech-bolt moves rearward the extractor continues its hold upon the cartridge-shell until it is ejected.

In order to simplify the extractor and its attachment to the breech-bolt, the extractor $z$ and its spring are made integral, and it is seated in a hole bored lengthwise entirely through the breech-bolt from the rear to the front, parallel to the axis of the same, at the right side of and slightly below the seat of the firing-pin, see Figs. 3, 4 and 8. The rear portion of this hole is increased in size, and the rear portion of the extractor $z$ is cylindrical and fits in this part of the seat, the shoulder formed by the enlargement of the extractor and of the seat serving as a positive stop in forward direction for the extractor in the breech-bolt. As shown in Fig. 8, forward of this shoulder the extractor forms a strong curved spring, the tension of which presses its hook at the forward end inward toward the center of the breech-bolt, the elastic portion of the extractor bearing on the inner side of the seat at the point where it projects from the face of the breech-bolt, and on the outer side of the seat at a place nearer to the enlarged rear portion. At the rear end a segment is removed from the inner side of the extractor to conform to the slot in the breech-bolt for the hammer in the down position, and forward of this a vertical recess is cut in the inner side of the extractor in which the plate $p$ fits. By this means the plate $p$ not only locks the firing-pin in the breech-bolt, but it also secures the extractor in the breech-bolt, and on the removal of the plate $p$ the extractor may be placed in its position or removed without the aid of any tools.

The hammer $q$, sear $r$, safety $s$, are pivotally mounted in the frame in rear of the grip, the trigger $t$ is seated in front of the same and carries a connecting piece $t^1$ to transmit its movement to the sear. In the lower rear portion of the grip the trigger-spring $t^3$, and the sear- and safety-spring $r^2$ are arranged, their lower ends seated upon a stud $a^5$ projecting from the rear wall of the magazine-seat in the grip.

In rear of the springs the grip is closed by the butt-piece $u$, which slides from below into the grip, being guided therein by having longitudinal ribs fitting in corresponding grooves in the sides of the grip, a transverse rib $u^2$ projecting from the front of the butt-piece rests against the sear-spring and holds it and the trigger-spring in place. Within the butt-piece the spiral main-spring $v$ is seated, carrying in each end a piston, the spring and pistons being movably secured in the butt-piece by a small transverse pin $u^3$ which projects into the path of the upper piston $v^1$. At the lower end a pin $u^1$, fitted transversely through the sides of the grip and the butt-piece, secures the same in the grip, and the rounded end of the lower piston $v^2$ projects into a correspondingly rounded groove in the center of the pin $u^1$, and yieldingly holds the pin in its place.

The top of the upper piston $v^1$ is concave or cup-shaped and receives the lower end of the strut $q^1$ the upper end of which is pivotally attached to the hammer $q$ in rear of its pivot; the strut $q^1$ transmits to the hammer the tension of the main-spring, tending to force the hammer into contact with the firing-pin, and when the hammer is dismounted, the strut may serve to push the pivot-pins of the other parts out of the frame.

In rear of the hammer and above the butt-piece $u$, the grip-lever $w$ is secured in the grip by the pivot-pin $w^1$, and a branch $r^3$ of the divided sear-spring yieldingly holds the grip-lever $w$ in the operative position, in which its lower portion projects from the rear of the grip, and in which a projection from the front of the grip-lever $w$ stands in rear of the connecting-piece $t^1$ and locks the trigger against operation. When the grip is grasped, as in the act of firing, the grip-lever is automatically pressed into the grip, thereby releasing the trigger without requiring attention.

Heretofore in the pistols of this class, when the hammer was cocked ready for firing, and it became necessary to lower the hammer to the safety position without allowing it to touch the firing-pin, it required both hands of the user to accomplish this act, because the trigger had to be pulled with the first finger of the right hand to release the hammer and the grip-lever had simultaneously to be pressed into the grip to release the trigger for operation, to do this required the keeping of the thumb of the right hand in a horizontal position on the left side of the grip. Therefore it was impracticable to also extend the thumb of the right hand, while this hand pressed in the grip-lever and pulled the trigger, upward so as to rest upon the thumb-piece of the hammer and, thus controlling the hammer, to gently lower the same and restrain it from falling and from striking the firing-pin, because any attempt to do this would result in loosening the necessary hold upon the grip-lever. Consequently the lowering of the hammer had to be performed by the other hand, this is a serious drawback in a military arm, as a soldier and especially a mounted soldier does not in action have both hands free for such use. To overcome this difficulty, I have provided the grip-lever $w$ with a projecting nose $w^2$ in rear of its pivot, which stands closely in rear of and below the hammer when cocked, and the hammer is so fitted that it may be drawn rearward somewhat farther than to its cocked position. When the hammer is drawn fully back it strikes the nose $w^2$ and, by pressing the same downward, it causes the grip-lever to turn on its pivot forcing the lower portion into the grip, thereby releasing the trigger. By this arrangement the thumb of the hand grasping the grip needs not to be kept at the side of the grip for pressing in the grip-lever, but the thumb may be applied to the hammer and through the same operate the grip-lever to release the trigger, then the trigger may be operated with the first finger of the same hand to release the hammer and finally the thumb, still applied to the hammer, may allow the same to slowly descend to the safety position, without requiring the aid of the other hand. The rearward projecting nose $w^2$ of the grip-lever $w$ below the hammer $q$ and in rear of the pivot-pin $w^1$, serves to perform another important function in addition to that of providing the point of contact between the grip lever and the hammer, by means of which the grip lever may be operated to release the trigger by drawing the hammer fully rearward, as hereinbefore described.

In automatic firearms in which, on firing, the uncovered hammer is returned to the cocked position by the rearward movement of the breech-bolt sliding on the frame under the energy of the recoil, this movement of the breech bolt and consequently the cocking of the hammer take place so rapidly that it is very essential to positively guard the hand of the operator grasping the grip of the pistol against inadvertently moving to a position in which it might come in contact with the hammer while the same is being cocked; because by such contact the hand would be exposed to receive serious injury.

As shown in the drawings, I have constructed the frame of the pistol with the usual rearward projection between the hammer and the grip to insure a secure grasp, and to prevent the hand from slipping upward; but as an additional preventative I have extended the nose $w^2$ of the grip lever $w$ rearward considerably beyond the frame, and have formed its lower portion so as to provide a guard which positively prevents the hand grasping the grip from coming in contact with the hammer. The projecting nose $w^2$ being of the same width as that of the hammer and its sides corresponding vertically with those of the hammer, the nose fully covers and guards the rear and underside of the hammer. This construction is efficient and adds but very little to the weight of the arm, being much lighter than if the frame between the hammer and the grip lever in its entire width were extended forward a similar distance to form the necessary guard.

The pivot-pin $r^1$ of the sear and safety, being slightly larger in diameter at the right end, can be entered or removed from the right side of the frame only, the grip-lever pivot-pin $w^1$ being largest at the left end must be entered and removed from the left side of the frame, its right end projects a small distance from the right side of the frame, and has an annular groove. The hammer pivot-pin $q^2$, fitted from the right side in the frame, carries on its right end a thin integral plate $q^3$, which rests against the right side of the frame and extends forward and downward to cover the end of the sear pivot-pin $r^1$, while the rear end of the plate extends to the grip-lever pivot-pin $w^1$ and enters the groove in the same, the straight top of the plate $q^3$ is parallel to and lies below the edge of the breech-slide, by which the plate is prevented from turning. By this arrangement the plate $q^3$ and the hammer pivot-pin $q^2$ are locked in place when the breech-slide is on the frame, while the pivot-pins $r^1$ and $w^1$ are kept in the frame by the plate $q^3$ of the hammer pivot-pin. In Fig. 1 the plate $q^3$ is shown in dotted lines and in Fig. 3 a rear view of the plate and of the end of the pivot-pin $w^1$ is shown.

When the breech-slide has been removed from the frame, the three pivot pins may be readily withdrawn, for this purpose the plate $q^3$ is turned, withdrawing its rear end downward from the groove in the grip-lever pivot-pin, uncovering the sear pivot-pin and raising the forward end of the plate beyond the top of the frame. This allows the plate $q^3$ with the pivot-pin to be withdraw from the frame, thereby liberating the hammer $q$ for removal. The strut $q^1$ depending from the hammer may then be utilized to push out the two remaining pivot-pins and also the pin holding the butt-piece in the grip.

The removable cartridge-holder or magazine $x$, of usual form and construction, is locked in the grip by the magazine-catch $y$, fitted transversely through the grip in rear of the trigger, its reduced and checkered end projecting from the left side of the grip convenient for operation by the thumb of the hand holding the grip. The cylindrical body of the catch $y$ intersects the front end of the magazine-seat in the grip, and a section of the catch has been removed to correspond with and to clear the magazine-seat when the catch $y$ is pressed inward from the left toward the right side of the grip; with the catch thus pressed in, a magazine may be freely entered into or withdrawn from the seat in the grip. See Figs. 4, 5, 6, 7, 7$^a$ and 7$^b$. At the right end the catch $y$ carries a projecting lug $y^1$ which fits into a corresponding opening through the right side of the grip and prevents the catch from turning. Within the catch $y$ a spiral spring $y^6$ and a piston $y^3$ are seated, entered from the right side, the left end of the spring bearing against the bottom of the seat in the catch, the right end resting against a shoulder on the piston, while a radially projecting stud $y^4$ on the piston $y^3$ extends outward through a slot in the catch $y$ into an annular recess in the wall of the grip surrounding the right end of the catch. The stud $y^4$ of the piston thus locks the same and the catch $y$ in the grip and the tension of the spring $y^6$ is exerted to yieldingly press the catch toward the left side, where the reduced end of the catch projects from the grip. On its inner face the lug $y^1$ of the catch carries a horizontal locking-rib $y^2$, which normally projects into the magazine-seat, and the magazine $x$ is provided on the right side near its front with a corresponding recess $x^1$ into which the rib $y^2$ enters when the magazine is in its place in the grip, the rib thereby locking the magazine in the seat.

By pressing against the projecting left end of the catch, the same is moved inward so as to withdraw the locking rib out of the magazine which is thereby released and free for removal from the grip; on inserting a magazine from below into the grip the top of the magazine encounters a beveled underside of the locking-rib $y^2$, (see Figs. 7 and 7$^b$,) and causes the catch to yield, until, at the end of the upward movement of the magazine, the rib enters the recess $x^1$ in the magazine and locks the same in place.

From the rear of the trigger $t$ the rib $t^2$ projects, extending to the upper forward side of the catch $y$ and there registering with a corresponding recess $y^5$ in the catch (see Figs. 7 and 7$^a$,) so located therein laterally that it permits the trigger to be operated whenever a magazine is in the grip and the locking-rib $y^2$ of the catch $y$ has locked the magazine therein, as, with magazine and catch in these relative positions, the inner face of the locking-rib $y^2$ rests against the forward edge of the recess $x^1$ in the magazine, and this contact prevents the catch $y$ from being moved by its spring fully to the left side to its released position. When, however, the magazine is unlocked and withdrawn from the grip, the catch $y$ on its release is at once moved by its spring fully to the left side, its movement in that direction being then only limited by the contact with its seat in the grip of the shoulder on the catch formed where the reduced left end and the body meet; in this released position of the catch the recess in its upper forward side does not register with the rib $t^2$ of the trigger and therefore the trigger is then locked in the forward position against rearward movement or operation. This automatic locking of the trigger in the absence of the magazine positively prevents accidental firing, due to the pulling of the trigger in the erroneous belief that all cartridges have been removed from the pistol by the removal of the magazine, whereas an unfired cartridge may have remained in the chamber of the barrel.

On introducing a magazine into the grip the trigger is automatically released, ready for operation. When a magazine is in its place, the operation of the trigger, as for firing a shot, moves the rib $t^2$ of the trigger rearward into the recess $y^5$ in the catch $y$ and the rib $t^2$ thus standing in the recess $y^5$ securely locks the catch in the operative position, thereby positively preventing its release and the accidental removal of the magazine, which might result from the shocks due to the firing, if the catch were not locked by the trigger, but held in position yieldingly only by its spring. By this arrangement of the rib $t^2$ on the trigger and the corresponding recess $y^5$ in the catch, the catch automatically locks the trigger against operation when the magazine is removed from the grip, and the trigger is automatically released for operation by the introduction of a magazine into the grip. Vice versa, the catch is free for operation to release the magazine for removal while the trigger is at rest in the forward position, but when the trigger is pulled to the rear it locks the catch against operation and thereby locks the magazine against removal; on release of the trigger and its return forward the catch is automatically released for operation.

It will be evident that various features of this invention may be employed independently of the rest, and in hand-operated or other firearms of a different kind from that which I have described herein, and that various changes in form and arrangement of the parts may be made without departing from the spirit of the invention.

What I claim, and desire to secure by Letters Patent, is:

1. In a firearm, the combination of a frame, a barrel movable longitudinally on said frame, a breech-block or bolt carrier sliding on said frame and comprising integrally a breech-bolt, a forward semi-tubular extension and a depending abutment preventing removal rearward of the bolt carrier from the frame, and means for attaching the barrel to the frame after said barrel in and with the bolt carrier has been slid upon the frame from the front, so as to permit the longitudinal movement of the barrel upon the frame.

2. In a firearm, the combination of a frame, a barrel movable longitudinally and vertically on said frame, a breech block or bolt carrier sliding on said frame and comprising integrally a breech bolt, a forward semi-tubular extension and a depending abutment preventing removal rearward of the bolt carrier from the frame, and means for attaching the barrel to the frame after said barrel in and with the bolt carrier has been slid upon the frame from the front, so as to permit the longitudinal and vertical movement of the barrel upon the frame.

3. In a firearm, the combination of a frame, a barrel movable longitudinally on said frame, a breech-block or bolt carrier sliding on said frame and comprising integrally a breech bolt, a forward semi-tubular extension and a depending abutment preventing removal rearward of the bolt carrier from the frame, interlocking means for locking the bolt carrier to the barrel when said parts are in their forward position, and means for attaching the barrel to the frame after said barrel in and with the bolt carrier has been slid upon the frame from the front, so as to permit the longitudinal movement of the barrel upon the frame.

4. In a firearm, the combination of a frame, a breech block or bolt carrier sliding on said frame and comprising integrally a breech bolt, a forward semi-tubular extension and a depending abutment preventing removal rearward of the bolt carrier from the frame, a barrel movable longitudinally and vertically on said frame, interlocking means carried by said barrel and caused by the movements thereof to interlock and to unlock the barrel and the bolt carrier, and means for attaching the barrel to the frame after said barrel in and with the bolt carrier has been slid upon the frame from the front, so as to permit the longitudinal and vertical movement of the barrel upon the frame.

5. In a firearm, the combination of a frame, a breech block or bolt carrier sliding on said frame and comprising integrally a breech bolt, a forward semi-tubular extension and a depending abutment preventing removal rearward of the bolt carrier from the frame, a barrel movable longitudinally and vertically on said frame and having a projection caused by the movements thereof to enter or to leave a recess in said bolt carrier, and means for attaching the barrel to the frame after said barrel in and with the bolt carrier has been slid upon the frame from the front, so as to permit the longitudinal and vertical movement of the barrel upon the frame.

6. In a firearm, the combination of a frame, a breech block or bolt carrier sliding on said frame and comprising integrally a breech bolt, a forward semi-tubular extension and a depending abutment preventing removal rearward of the bolt carrier from the frame, a barrel having a depending lug and a link pivotally secured therein, and a link pin in the frame for attaching the link and the barrel to the frame after said barrel in and with the bolt carrier has been slid upon the frame from the front.

7. In a firearm, the combination of a frame, a breech block or bolt carrier sliding on said frame and comprising integrally a breech bolt, a forward semi-tubular extension and a depending abutment preventing removal rearward of the bolt carrier from the frame, a barrel having a depending lug and a link pivotally secured therein, said frame having a recess to receive said lug, and a link pin in the frame for attaching the link and the barrel to the frame after said barrel in and with the bolt carrier has been slid upon the frame from the front.

8. In a firearm, the combination of a frame, a breech block or bolt carrier sliding on said frame and comprising integrally a breech bolt, a forward semi-tubular extension and a depending abutment preventing removal rearward of the bolt carrier from the frame, a barrel having a depending lug, a link pivotally secured therein, and a downward projection from said lug, said frame having a recess to receive said lug, and a link pin in the frame for securing the barrel to the frame after the bolt carrier has been slid upon the frame from the front, whereby said lug limits the movement of said barrel on the frame in rearward direction, and said lug and said link pin limit the movement of the barrel and of the bolt carrier on the frame in forward direction.

9. In a firearm, the combination of a frame, a breech block or bolt carrier sliding on said frame and comprising integrally a breech bolt, a forward semi-tubular extension having a locking recess and a depending abutment preventing removal rearward of the bolt carrier from the frame, a barrel having a depending lug and a link pivotally secured therein, a link pin in the frame for attaching the link and the barrel to the frame after said barrel in and with the bolt carrier has been slid upon the frame, whereby said barrel may move longitudinally and vertically on said frame, and a projection on said barrel caused by the movements thereof to enter or to leave the locking recess in said bolt carrier.

10. In a firearm, the combination of a frame, a breech block or bolt carrier sliding on said frame and comprising integrally a breech bolt, a forward semi-tubular extension and a depending abutment preventing removal rearward of the bolt carrier from the frame, a barrel longitudinally movable on the frame, its front end mounted in a removable bushing in said bolt carrier, its rear end having an extension depending into the frame, and means for attaching the barrel to the frame after said barrel in and with the bolt carrier has been mounted on said frame, so as to permit the longitudinal movement of the barrel on the frame.

11. In a firearm, the combination of a frame, a breech block or bolt carrier sliding on said frame and comprising integrally a breech bolt, a forward semi-tubular extension and a depending abutment preventing removal rearward of the bolt carrier from the frame, the barrel movable on the frame, its rear end mounted on and secured to said frame for a limited double movement thereon, its front end securely supported in position in a removable bushing in said bolt carrier, the bore of said bushing being enlarged from the front end rearward to permit vertical movement of the rear end of said barrel, and means for attaching the barrel to the frame after said barrel in and with said bolt carrier has been mounted on said frame, whereby the barrel in its forward position has its rear end elevated on the frame above its front end, and in the rearward position of said barrel its rear end is lowered and the axis thereof is parallel to the top of the frame, and whereby the front end of said barrel is kept depressed, as and for the purpose specified.

12. In a firearm, the combination of a frame, a breech block or bolt carrier sliding on said frame, and comprising integrally a breech bolt, a forward semi-tubular extension and a depending abutment preventing removal rearward of the bolt carrier from the frame, the barrel having at its rear end a depending lug and a link pivotally secured therein, and having its front end securely supported in position in a removable bushing in said bolt carrier, and a link pin in the frame for attaching the barrel to the frame after said barrel in and with the bolt carrier has been slid upon the frame, whereby the rear end of said barrel has a limited double movement on said frame upon its front end as a fulcrum.

13. In a firearm, the combination of a frame, a breech block or bolt carrier sliding on said frame and comprising integrally a breech bolt, a forward semi-tubular extension having a locking recess and a depending abutment preventing removal rearward of the bolt carrier from the frame, a barrel movable on the frame within said forward extension and carrying at its rear end a projection and a depending lug and a link pivotally secured therein, the front end of said barrel being securely supported in position in a removable bushing in said bolt carrier, and a link pin in the frame for attaching the barrel to the frame after said barrel in and with said bolt carrier has been slid upon the frame, whereby the rear end of said barrel has a limited double movement on said frame upon its front end as a fulcrum to cause said projection to enter or to leave the locking recess in said bolt carrier.

14. In a firearm, the combination of a frame, a barrel, a bolt carrier sliding on said frame, a reaction spring, a shoulder in the frame for supporting the rear end of the reaction spring, a depending abutment on the bolt carrier for inclosing the forward portion of the reaction spring, a bushing secured removably in the front end of said bolt carrier, said bushing having a depending part adapted to confine said reaction spring at its front end, whereby the thrust of said reaction spring is transmitted in forward direction through the bushing to the bolt carrier.

15. In a firearm, the combination of a frame, a barrel, a bolt carrier sliding on said frame, a reaction spring, a shoulder in the frame for supporting the rear end of the reaction spring, a depending abutment on the bolt carrier for inclosing the forward portion of the reaction spring, a bushing secured rotatably in the front end of said bolt carrier for locking it to or releasing it from said bolt carrier, and having a depending part adapted to confine said reaction spring at its front end, whereby the thrust of said reaction spring is transmitted in forward direction through the bushing to the bolt carrier.

16. In a firearm, the combination of a frame, a barrel, a bolt carrier sliding on said frame, a reaction spring, a shoulder in the frame for the rear end of the reaction spring, a depending abutment on the bolt carrier for inclosing the forward portion of the reaction spring, a shouldered plug carried on the front end of the reaction spring and seated loosely in the abutment depending from the bolt carrier, a bushing secured removably in the front end of said bolt carrier and having a depending part adapted to confine said plug in said abutment, whereby the thrust of said reaction spring is transmitted in forward direction through the plug and the bushing to the bolt carrier.

17. In a firearm, the combination of a frame, a barrel, a bolt carrier sliding on said frame, a reaction spring, a shoulder in the frame for the rear end of the reaction spring, a depending abutment on the bolt carrier for inclosing the forward portion of the reaction spring, a shouldered plug carried on the front end of the reaction spring and seated loosely in the abutment depending from the bolt carrier, a bushing secured rotatably in the front end of said bolt carrier for locking it to or releasing it from said bolt carrier, and having a depending part adapted to confine said plug in said abutment, whereby the thrust of said reaction spring is transmitted in forward direction through the plug and the bushing to the bolt carrier and said bushing is locked against rotation by the plug.

18. In a firearm, the combination of a frame, a barrel secured to said frame, a bolt carrier sliding on said frame and provided with a locking shoulder, a cartridge holder having a spring actuated follower, and a handle comprising a locking pin for securing the barrel to the frame, an upward projection for engaging the locking shoulder on the bolt carrier, and an inward extension in the path of said follower.

19. In a firearm, the combination of a frame, a barrel secured to said frame, a bolt carrier sliding on said frame and provided with a locking shoulder, a cartridge holder having a spring actuated follower, and a handle comprising a locking pin for securing the barrel to the frame, an upward projection for engaging the locking shoulder on the bolt carrier, an inward extension in the path of said follower, an upward projection on said extension located within said bolt carrier, whereby said handle is locked against removal from said frame.

20. In a firearm, the combination of a frame, a barrel secured to said frame, a bolt carrier sliding on said frame and provided with a locking shoulder, a cartridge holder having a spring actuated follower, and a handle comprising a locking pin for securing the barrel to the frame, and an upward projection for engaging the locking shoulder on the bolt carrier, an inward extension in the path of said follower, and an upward projection on said extension located within the bolt carrier for locking said handle against removal, said bolt carrier having a recess for at will removing and replacing the handle.

21. In a firearm, the combination of a frame, a hammer, a sear, a trigger, and springs for said sear and trigger mounted in said frame, a butt piece removably secured in said frame by a pin, a main spring carried in the butt piece, a connector between said hammer and said main spring, and a connector between said main spring and said pin for yieldingly holding said pin in place.

22. In a firearm, the combination of a hammer, a sear and a trigger, a grip lever held normally in position to prevent the release of said hammer, springs for said parts, and a projection on said grip lever in the path of said hammer, whereby the hammer may be moved to operate said grip lever to permit the operation of said trigger and sear to release said hammer.

23. In a firearm, the combination of a hammer, a sear and a trigger, springs for said sear and trigger, a removable butt piece, a main spring carried in the removable butt piece, a connector between said hammer and said main spring, a grip lever, a spring to hold said grip lever normally in position to prevent the release of said hammer, and a projection on said grip lever in the path of said hammer, whereby the hammer may be moved to operate said grip lever to permit the operation of said trigger and sear to release said hammer.

24. In a firearm, the combination of a breech bolt carrying a firing pin shouldered at its rear end and a retractor spring, a locking plate removably seated in the breech bolt and having an opening to receive the rear end of said firing pin, whereby said plate locks the firing pin in place and said firing pin locks said plate in place.

25. In a firearm, the combination of a removable cartridge holder, a catch for locking said holder in place and for at will releasing the same, a trigger, and means operated by said catch for locking and for releasing said trigger.

26. In a firearm, the combination of a removable cartridge holder, a catch for locking said holder in place and for at will releasing the same, a trigger, and means operated by said trigger for locking said catch in operative position.

27. In a firearm, the combination of a removable cartridge holder, a catch for locking said holder in place and for at will releasing the same, a trigger, means operated by said catch for locking and for releasing said trigger, and means operated by said trigger for locking said catch in operative position.

28. In a firearm, the combination of a removable cartridge holder having a recess, a catch carrying a projection adapted for entering the recess in said holder to lock the same and for at will leaving said recess to release the holder, said catch being provided with a recess, a trigger carrying a rib adapted to enter the recess in said catch, whereby the operation of said catch locks or releases the trigger, and the operation of the trigger locks the catch in position to lock said holder.

29. In a firearm, the combination of a breech bolt carrying a shell extractor having a recess in its rear portion, and a locking plate removably seated in the breech bolt and extending into the recess in said extractor, whereby said plate locks the extractor against removal from the breech bolt.

30. In a firearm, the combination of a breech bolt carrying a shell extractor shouldered in front of its rear portion and having a recess in its rear portion, and a locking plate removably seated in the breech bolt and extending into the recess in said extractor, whereby said plate locks the extractor against removal from the breech bolt.

31. In a firearm, the combination of a breech bolt carrying a firing pin shouldered at its rear end and a retractor spring, a shell extractor removably seated in the breech bolt and having a recess in its rear portion, and a locking plate removably seated in the breech bolt and having an opening to receive the rear end of said firing pin and extending into the recess in said extractor, whereby said firing pin locks said plate in place and said plate locks the firing pin and the extractor in place.

32. In a firearm, the combination of a frame, a slide mounted on said frame, a taper pivot pin seated in said frame, and a second pivot pin seated in said frame comprising a plate integral therewith to cover and lock in place said first mentioned pivot pin, said plate being held in covering and locking position by said slide.

33. In a firearm, the combination of a frame, a slide mounted on said frame, a pivot pin rotatably seated in said frame and comprising a plate integral therewith, and one or more additional pivot pins being taper and seated in said frame and engaged by said plate and locked in place thereby, said plate being held in locking position by said slide.

34. In a firearm, the combination of a frame, a slide mounted on said frame, a taper pivot pin seated in said frame, the smaller end of said pivot pin protruding from the frame and having a recess, and a second pivot pin rotatably seated in said frame and comprising a plate integral therewith, said plate extending into said recess and being held against rotation by said slide, whereby both pivot pins are locked in the frame.

35. In a firearm, the combination of a frame, a barrel secured to said frame, a bolt carrier sliding on said frame, a cartridge holder having a spring actuated follower, and a handle comprising a locking pin for securing the barrel to the frame, an inward extension in the path of said follower, and an upward projection on said extension located within said bolt carrier, whereby said handle is locked against removal.

36. In a firearm, the combination of a frame, a barrel secured to said frame, a bolt carrier sliding on said frame, a cartridge holder having a spring actuated follower, and a handle comprising a locking pin for securing the barrel to the frame, an inward extension in the path of said follower, and an upward projection on said extension located within the bolt carrier for locking said handle against removal, said bolt carrier having a recess for at will removing and replacing the handle.

37. In a firearm, the combination of a frame having a grip, a hammer and a grip lever pivotally mounted in said frame, and a rearward extension of said grip lever covering the entire under side of said hammer and forming a guard between said hammer and said grip, whereby contact with said hammer while being cocked is prevented.

38. In a firearm, the combination of a frame having a grip, a hammer, a sear and a trigger, a grip lever held normally in position to prevent the release of said hammer, springs for said parts, a projection on said grip lever in the path of said hammer, whereby the hammer may be moved to operate said grip lever to permit the operation of said trigger and sear to release said hammer, and a rearward extension of said projection forming a guard between said hammer and said grip.

This specification signed and witnessed this 1st day of February, A. D. 1910.

JOHN M. BROWNING.

In the presence of—
A L. ULRICH.
K. POWERS.